Oct. 28, 1930.  J. C. BECHARD  1,779,871
SAFETY DEVICE FOR AEROPLANES OR THE LIKE
Filed March 15, 1929    4 Sheets-Sheet 1
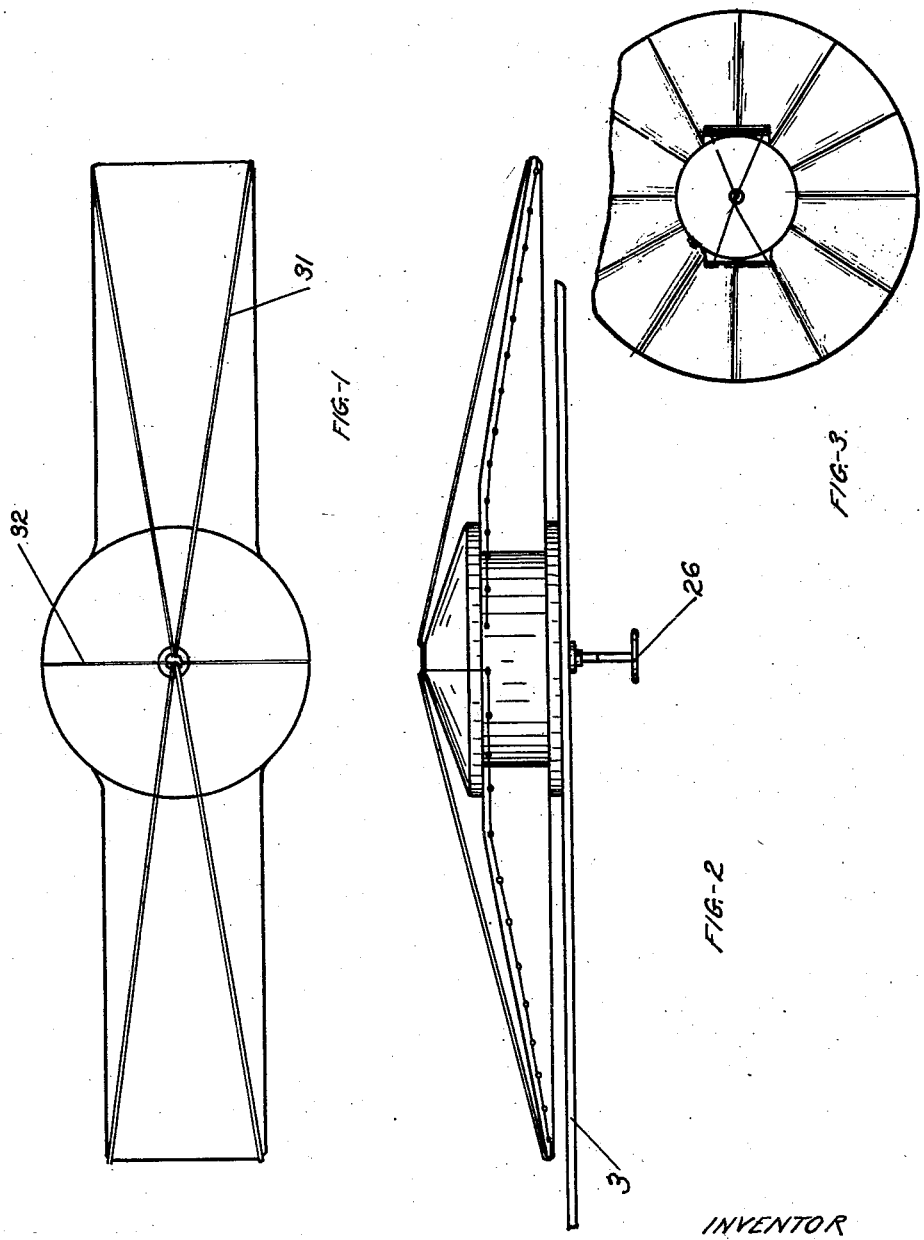
INVENTOR
JOSEPH C. BECHARD
BY  *Manuel C. Rosa*
ATTORNEY

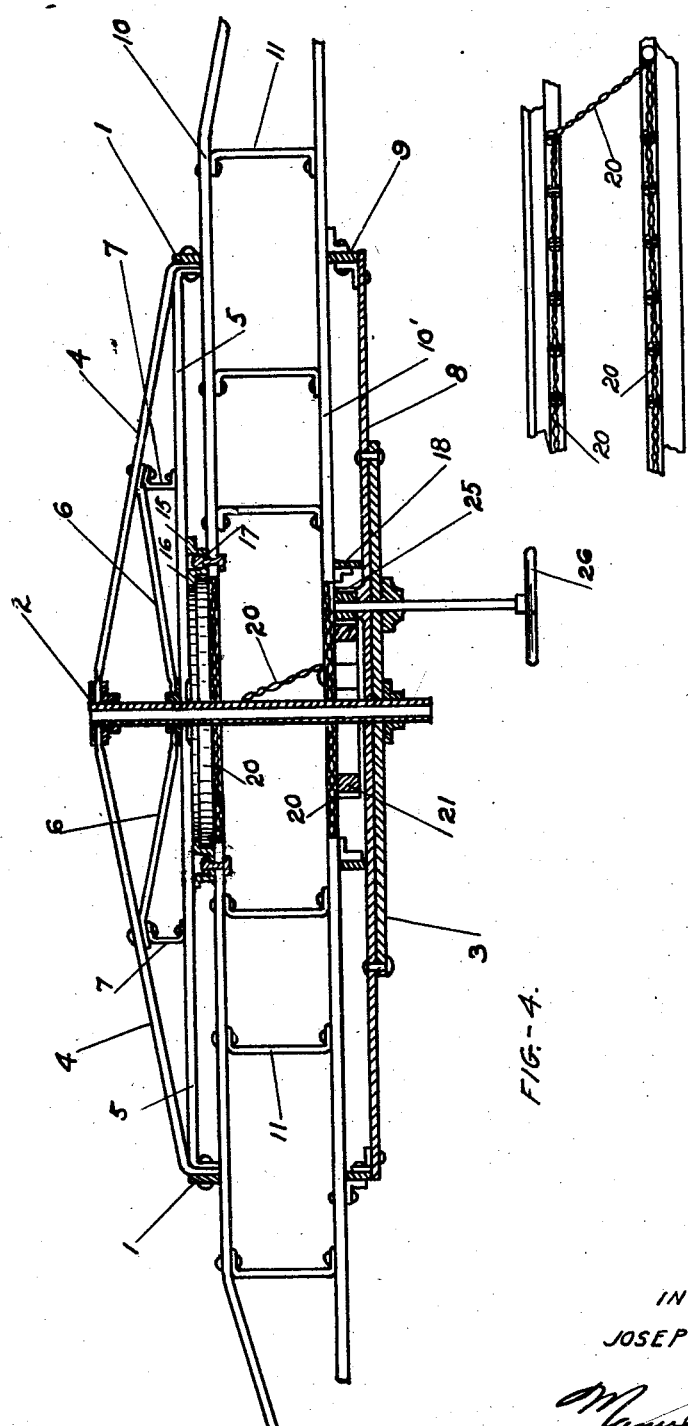

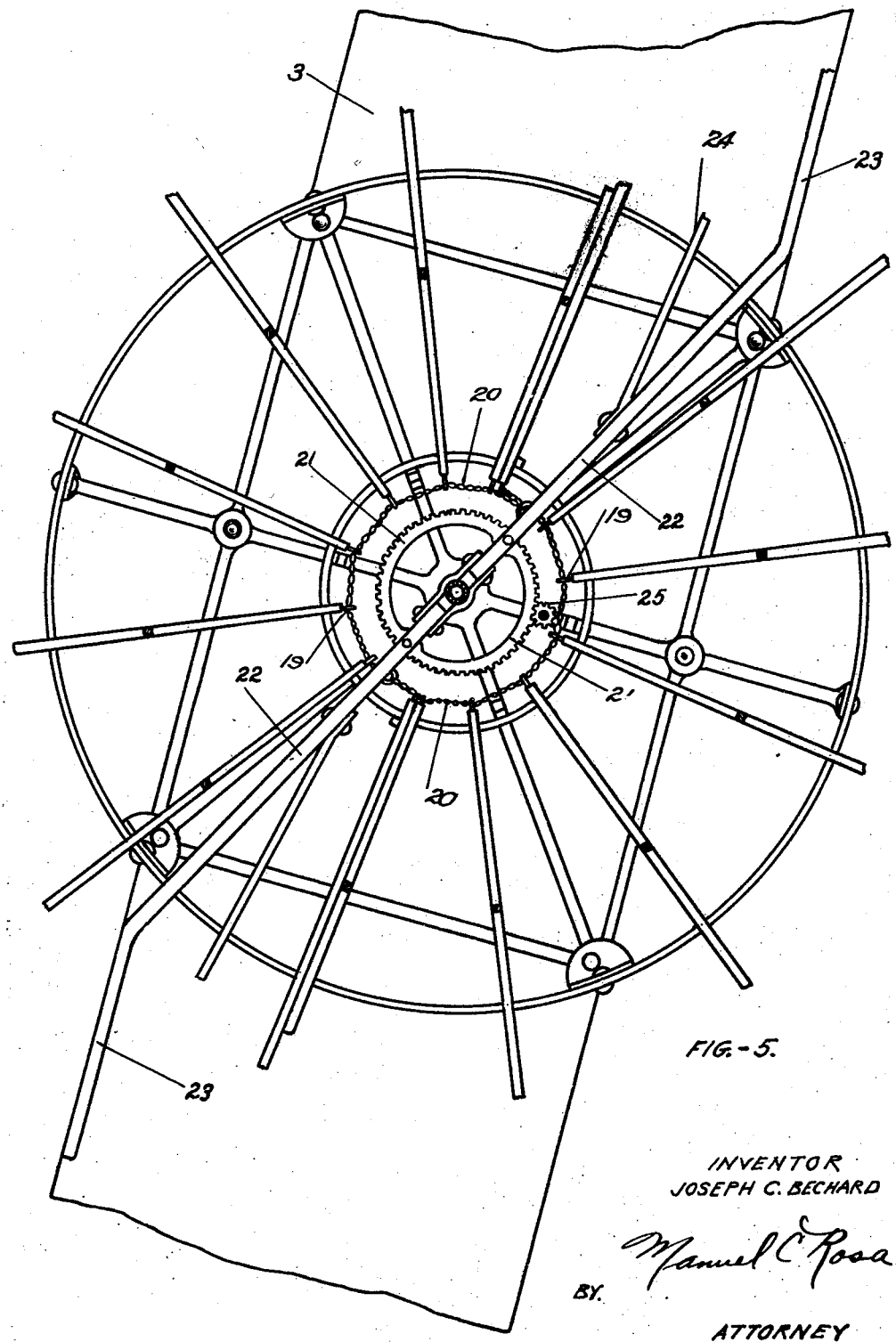

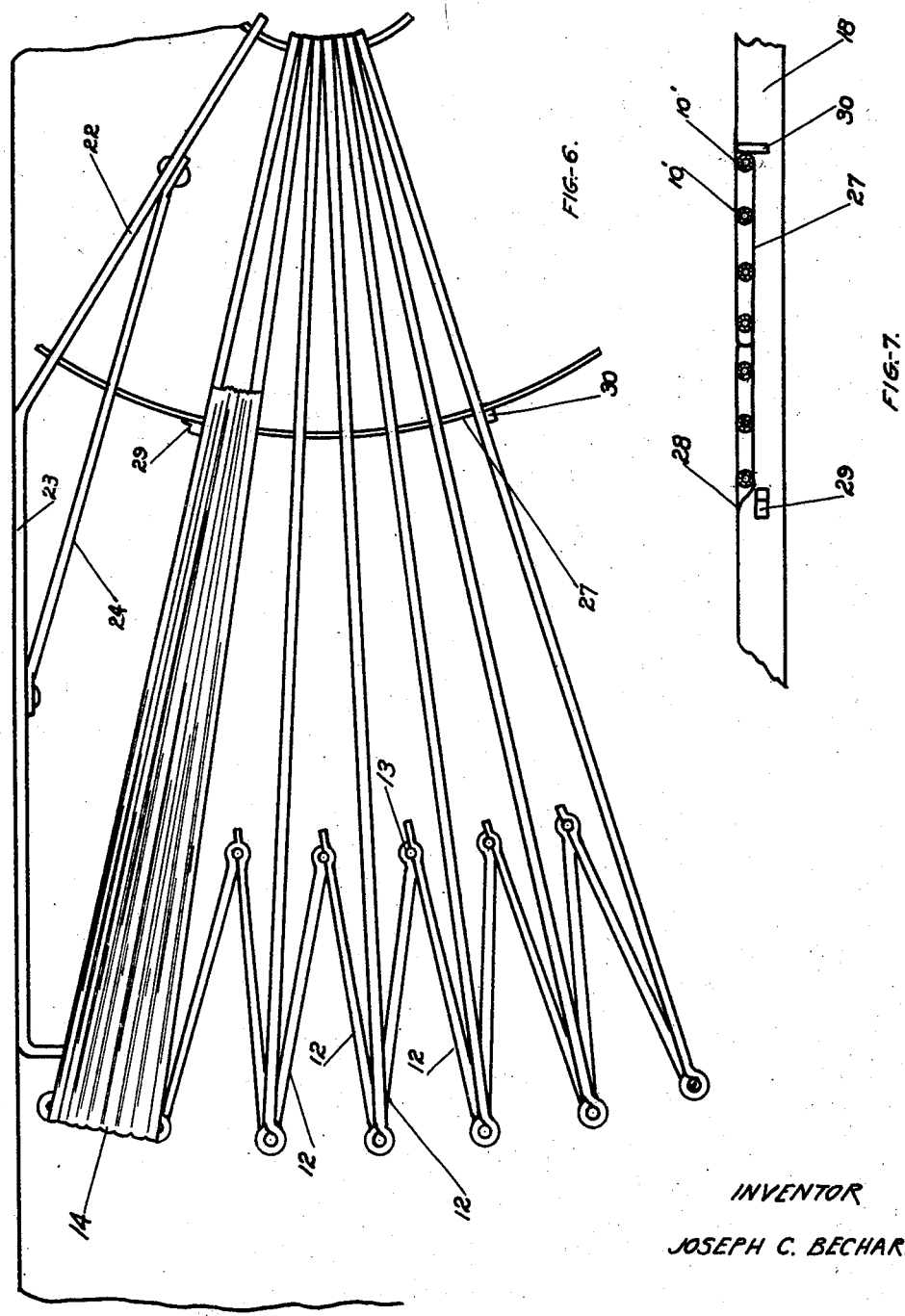

Patented Oct. 28, 1930

1,779,871

UNITED STATES PATENT OFFICE

JOSEPH C. BECHARD, OF FALL RIVER, MASSACHUSETTS

SAFETY DEVICE FOR AEROPLANES OR THE LIKE

Application filed March 15, 1929. Serial No. 347,278.

My invention relates to an improved safety device to be used in conjunction with an aeroplane. In the case of an aeroplane or any other heavier than air machines, should anything happen at any time during flight, such as stalling of the engine or running out of gas, the machine is forced to make a quick landing and sometimes this is not possible. In many instances if it were possible to maintain the aeroplane adrift in the air the slight repairs necessary might be made.

It is an object of my invention to provide a safety device to be used with aeroplanes which is simple in structure and reliable in operation.

A further object of my invention is to provide a safety device to be used in conjunction with an aeroplane which during disuse does not interfere with flight and which is capable of being thrown into use by means of a hand wheel near the pilot.

A still further object of my invention is to provide a safety device for aeroplanes which partakes of the nature of a parachute and consists of a series of braced trusses to which is secured a suitable parachute cloth, said trusses being capable of being opened to provide the air lift for maintaining the aeroplane in the air for a long period of time.

Other objects and advantages will appear from the detailed description which follows.

I attain these objects and advantages by means of the construction disclosed in the accompanying drawings wherein Figure 1 is a plan view of the wings of an aeroplane showing my safety device when not in use, the device being covered by canvas.

Figure 2 is a side elevational view of the top wing of an aeroplane disclosing the height of the safety device and also a hand wheel which is beside the pilot and through which the safety device is thrown into operation.

Figure 3 is a plan view showing the appearance of the parachute when opened.

Figure 4 is a vertical cross sectional view of the parachute structure which is secured to the upper wing of the aeroplane.

Figure 5 is a plan view showing the actuating mechanism of the parachute, the parachute cloth being removed.

Figure 6 is a detail view showing the construction of the ribs or trusses to which the parachute cloth is secured and which are capable of being spread apart to form a parachute.

Figure 7 is a detail view of the guide for the radial rib members.

Figure 8 is an enlarged view showing the continuous chain span which joins all the radial members to provide simultaneous movement.

Similar numerals refer to similar parts throughout the several views.

Referring to Figure 4 of the drawings there is disclosed a fixed circular member 1 which is secured to a tubular upright member 2 which passes through the wing 3. The circular member 1 is provided with radial truss members 4 and 5 which in turn are braced by the braces 6 and 7. A corresponding circular member 8 is provided below the circular member 1 and adjacent the upper wing of the aeroplane. The circular member 8 is provided with a track 9 which serves a purpose hereinafter to be described. The member 8, likewise, has the tubular upright 2 passing through its axis. Disposed between the circular members 1 and 8 are provided radial rib-like members 10 which are constructed in truss-like form and provided with vertical stays 11 for strengthening the same. The rib-like members 10 are sufficient in number to form a circular span when spaced apart. As shown in Figure 6, each of the members 10 are hingedly connected to one another so that the distance between the members is limited. The hinge connection may be produced in any suitable way and in the instant case the arms 12 are hingedly connected to the end of the truss members and are hingedly connected to one another as shown at 13. The parachute cloth 14 is disposed between the rib members in a folded condition and being adapted, when the rib members are spread apart, to form a complete circular top and capable of withstanding the air pressure.

Secured to the under side of the truss members 5 are the annular rings 15 and 16 having opposing concave grooves therein which are adapted to form a race way for the knob members 17 which are secured to the end of each of the rib members 10. Secured to the circular member 8 are two concentric annular flanges 9 and 18 which serve as tracks upon which the rib members 10, 10' travel. These track members may be provided with suitable angle rings, such as shown, for the purpose of greater stability. The inner ends of the rib members 10, 10' are provided with loop portions 19 to which are connected chain spans 20, the top series being joined to the bottom series for simultaneous movement.

Rotatably mounted on the tubular upright 2 is the driven gear member 21 which is positioned above the circular member 8 and below the rib members. Fixedly secured to said driven gear member is the diametral member 22 which is provided at both ends with the arms 23 which are in alignment with the sides of the wing 3 of the aeroplane. The arms 23, which form an angle and are suitably braced by the brace 24 are secured at the extremity to the outermost rib member of each group. It will be appreciated that the movement of the diametral member will set in motion the expansion of all the rib members. This movement is made possible by means of the driving gear 25 which is operated by the pilot through the hand wheel 26.

The locking device for locking rib members against further movement, when the diametral member has described an arc of 180 degrees, is provided with a long cut-out portion 27 which has a depth equal to the thickness of the ribs 10', one end of said cut-out portion having a shoulder portion 28 which provides an incline over which the rib members may pass out of the cut-out portion. Positioned below the shoulder portion 28 is the stop member 29 which serves as a stop member. The last rib member at that end of the cut-out portion which is away from the end of the shoulder portion is provided with a lug member 30 attached thereto, which is capable, upon striking the stop member 29, of arresting the movement of the rib members. A similar cut-out portion is provided on the other side of said annular track member 18 in a diametrically opposite position.

The structure above described, when in disuse, is in a very compact condition positioned above the top wing of the aeroplane. It is desirable that a canvas covering be placed over the structure as shown in Figures 1 and 2, and this canvas covering may be secured together by continuous strands, the ends of which are accessible to the pilot near the hand wheel 26, the ends of the strands passing through the tubular upright 2. The method of fastening shown is merely suggestive and any means whereby the canvas may be quickly liberated from the structure is suitable.

It will be appreciated that on pulling the strands the canvas top flies off and to prevent the loss of the top it is possible to attach other strands for the purpose of holding the canvas top to the aeroplane. In Figure 1 the diagonal strands 31 are for the purpose of releasing the canvas top, the cross strands 32 serving to hold the released top to the wing to save it from loss.

The operation of the safety device is as follows. The aeroplane with which the safety device is to be equipped is arranged so that the top is covered in the manner suggested and the cords and the hand wheel for actuating the safety device made accessible to the pilot. In the event that the safety device is necessary, while the aeroplane is aloft, the pilot first pulls the diagonal strands for the purpose of releasing the canvas top. Then by giving the hand wheel several turns the radial rib members are caused to spread out in umbrella fashion and after the rib members have formed a complete circle the locking members arrest further movement. It will be thus seen that a parachute is formed by the rib members which is very strong and firmly braced. The rib members are severally joined together by chain spans of equal length, the movement of one rib member causing the other members to follow.

All that has been said above in the description of my preferred embodiment is offered by way of illustration and not limitation. I do not wish to be limited to the exact structure of the preferred embodiment shown and described, or to any particular material used in the construction of parts, or to the design of parts, but desire protection as against any variations in structure or substitution of equivalents which utilize the principle of my invention and fall within the purview of my invention and are within the spirit and scope of the following claims.

The invention having been set forth what is claimed as new and useful is:

1. In combination with an aeroplane wing, an upright member, radial members surrounding said upright member, said upright member being provided with a driven gear, a driving gear meshing with said driven gear, a hand wheel operatively connected to said driven gear and adapted to extend below the aeroplane wing, said radial members being secured together at their inner extremities by flexible connectors and having a cloth of high tensile strength between them, track members upon which said radial rib members travel, a diametral member secured to said driven gear and secured at each end to the adjacent rib member, said diametral member being capable, when operated by said gears, of pulling said radial members along said track members, said radial members being capable, when fully opened, of forming a parachute.

2. In combination with an aeroplane wing, concentric track members secured to said wing, a tubular upright member passing through said wing, radial members resting on said track members, said radial members being connected together at their inner extremities and having sectors of cloth between them, said radial members being capable of moving collectively, and means for moving certain of said radial members whereby a parachute is formed.

3. In combination with an aeroplane wing, concentric track members secured to said wing, a tubular upright member passing through said wing, radial members resting on said track members, said radial members being connected together at their inner extremities and having sectors of cloth between them, said radial members being capable of moving collectively, and means for moving certain of said radial members whereby a parachute is formed, one of said track members being provided with a cut-out portion within which said radial members lie when they are in a closed condition, said cut-out portion having a shoulder portion at one end over which said radial members may slide out of said cut-out portion, a stop member secured to said track member below said shoulder portion, one of said radial members being provided with a projection adapted to contact said stop member whereby the further travel of the radial members is arrested.

4. In combination with an aeroplane wing, a circular base member, a circular top member, radial members having a parachute canopy thereon positioned between said circular base member and said circular top member, said radial members being capable of circular movement between said top and base members, and operative means to open said radial members.

Signed at Fall River in the county of Bristol, State of Massachusetts, this first day of February, 1929.

JOSEPH C. BECHARD.